United States Patent
Petersohn (10) Patent No.: US 8,249,360 B2
(45) Date of Patent: Aug. 21, 2012

(54) METHOD AND DEVICE FOR THE AUTOMATED COMPARISON OF TWO SETS OF MEASUREMENT VALUES

(75) Inventor: Christian Petersohn, Berlin (DE)

(73) Assignee: Fraunhofer-Gesellschaft zur Foerderung der Angewandten Forschung E.V., München (DE)

( * ) Notice: Subject to any disclaimer, the term of this patent is extended or adjusted under 35 U.S.C. 154(b) by 206 days.

(21) Appl. No.: 12/738,144

(22) PCT Filed: Oct. 24, 2008

(86) PCT No.: PCT/EP2008/009188
§ 371 (c)(1),
(2), (4) Date: Jun. 8, 2010

(87) PCT Pub. No.: WO2009/053110
PCT Pub. Date: Apr. 30, 2009

(65) Prior Publication Data
US 2010/0260425 A1 Oct. 14, 2010

(30) Foreign Application Priority Data
Oct. 24, 2007 (DE) .......................... 10 2007 051 612

(51) Int. Cl.
*G06K 9/62* (2006.01)

(52) U.S. Cl. ........ 382/209; 382/218; 382/162; 382/103; 382/190; 382/170

(58) Field of Classification Search .................. 382/209, 382/218, 162, 103, 190, 170, 305; 702/189; 396/95
See application file for complete search history.

(56) References Cited

U.S. PATENT DOCUMENTS
7,035,775 B2 * 4/2006 Abe et al. ...................... 702/189
(Continued)

OTHER PUBLICATIONS

Rubner et al., "The Earth Mover's Distance as a Metric for Image Retrieval", International Journal of Computer Vision Kluwer Academic Publishers Netherlands, vol. 40, No. 2, 2000, XP00791089, ISSN: 0920-5691, pp. 99-121.

(Continued)

*Primary Examiner* — Ali Bayat
(74) *Attorney, Agent, or Firm* — Fay Kaplun & Marcin, LLP (57) ABSTRACT

A method and a device are for an automated comparison of at least two sets of measuring values. The measuring values of the two sets are assigned respectively to one class from a finite number of classes defined by indices so that a frequency distribution is defined respectively for each of the two sets, which frequency distribution indicates for each class a frequency of the measuring values assigned to this class. A distance measure reflecting a similarity or dissimilarity between the two sets of measuring values between these frequency distributions is calculated as a function of a final value of a first auxiliary value termed here match by way of example. The first auxiliary value match is calculated by an algorithm using two sets of variables in that, with a given maximum distance $d_{max} \geq 1$ for all integral distances d with $0 \leq d \leq d_{max}$, beginning with d=0 and continuing to larger distances d, respectively for all indices i and j at a distance from each other by the distance d. A current value of a further auxiliary value is defined as $m=\min(q_i', v_j')$, m stands for the further auxiliary value, $q_i'$ for the variables of a first of the two sets of variables and $v_j'$ for the variables of the second set of variables, the variables of the two sets of variables being defined at the beginning of the algorithm as $q_i'=q_i$, $v_j'=v_j$, wherein $q_i$ stands for the frequencies from a first of the two frequency distributions and $v_j$ for the frequencies of the second frequency distribution. Respectively the variables $q_i'$ and $v_j'$ are defined again by subtracting the current value of the further auxiliary value m and the current value of the further auxiliary value m, multiplied by a matrix element $a_{i,j}$, is added to a current value of the first auxiliary value match defined originally as match=0, the matrix elements $a_{i,j}$ forming a similarity matrix with $a_{i,i}=1$ for all indices i and $0 \leq a_{i,j} \leq 1$ for all indices i and j at a distance of at most $d_{max}$ with i≠j.

13 Claims, 1 Drawing Sheet

U.S. PATENT DOCUMENTS

| | | | | |
|---|---|---|---|---|
| 7,305,151 | B2 * | 12/2007 | Shiiyama | 382/305 |
| 7,346,631 | B2 * | 3/2008 | Amirghodsi | 382/306 |
| 7,627,178 | B2 * | 12/2009 | Suzuki et al. | 382/190 |
| 7,702,185 | B2 * | 4/2010 | Keating et al. | 382/305 |
| 2007/0110306 | A1 | 5/2007 | Ling et al. | |

OTHER PUBLICATIONS

Antsfeld et al., "Fast Greedy Optimal Algorithm for Hierarchical Matching", Electrical and Electronics Engineers in Israel, 2002, The $22^{nd}$ Convent Ion of Dec. 1, 2002, Piscataway, NJ, XP010631064, ISBM: 978-0-7803-7696-9, pp. 108-110.

Rahmi et al., "How Earth Mover's Distance Compares Two Bags", Mar. 5, 2007, XP007910781, http://people.csail.mit.edu/rahimi/papers/emd.pdf, 12 sheets.

Kazhdan, "Shape Analysis and Retrieval", Seminar on Shape Analysis and Retrieval Teaching Slides, 2004, XP 002559004, 31 sheets, http://web.archive.org/web20070226004923/http:www.cs.jhu.edu/misha/Fall04/09-14-04.ppt.

Archive of Seminar Page on Shape Analysis and Retrieval, Dec. 4, 2004, XP002559003, http://web.archive.org/web20041204090809/http://cs.jhu.edu/Fall04/09-14-04, 3 sheets.

Grauman et al., "Efficient Image Matching with Distribution of Local Invariant Features", Computer Vision and Pattern Recognition, 2005 IEEE Computer Society Conference on IEEE, Piscataway, NJ USA, vol. 2, Jun. 20, 2005, pp. 627-634, XP010817658, ISBN: 978-0-7695-2372-9.

Ling et al., "An Efficient Earth Mover's Distance Algorithm for Robust Histogram Comparison", IEEE Transactions on Pattern Analysis and Machine Intelligence, IEEE Service Center, vol. 29, No. 5, May 1, 2007, pp. 840-853, XP011175347, ISSN: 0162-8828.

Rahimi, "Index of /Rahimi/Papers"Dec. 4, 2009, CP002559003, http://people.csail.mit.edu/rahimi/papers, 2 sheets.

* cited by examiner

METHOD AND DEVICE FOR THE AUTOMATED COMPARISON OF TWO SETS OF MEASUREMENT VALUES

FIELD OF THE INVENTION

The invention relates to a method for the automated comparison of two sets of measuring values and also to a device for implementing such a method.

BACKGROUND INFORMATION

The sets of measuring values can concern for example quantities of image data which are recorded for example with a camera and respectively characterise an image. The method can then serve for identifying similar images, for example for automatic finding of images of a camera shot from a large quantity of shots or for finding separation points between successive shots.

It is known to process sets of measuring values in that the measuring values are assigned respectively to one class from a finite number of classes, occasionally also termed bins, which can be denoted with indices so that these measuring values are assigned to the classes and consequently a frequency distribution is defined, which indicates for each class a frequency of the measuring values of the respective set assigned to this class. The classes can thereby correspond typically to sub-intervals of an interval of the measuring values of assumable values. A known representation of such frequency distributions is formed by histograms. The technical object of comparing two or more sets of measuring values with each other, for example in order to identify events which can be compared in an automated and rapid manner during an evaluation of a large number of measuring value sets, can then be reformulated to the object of comparing two histograms with each other and of measuring a similarity between these histograms.

Various methods are known for comparing histograms or distributions which can be displayed by histograms. In the case of the simplest of these methods, the frequencies, assigned to the individual classes, of the frequency distributions to be compared are compared with each other class for class—or bin for bin—for example by measuring an overlap of the histograms corresponding to the frequency distributions. These methods can in fact be implemented with very low computational complexity but entail the great disadvantage that similarities between adjacent classes are not taken into account. Measuring values, which are in fact situated closely together but were assigned, because of the choice of classes, randomly to two different, e.g. adjacent, classes, are then treated as completely different and their proximity remains unconsidered for evaluation of the similarity of the corresponding histograms. These simple methods lead therefore in many cases to unsatisfactory and fairly uninformative results which allow in particular no reliable statement about the similarity of sets of measuring values or corresponding events. In particular, the results obtained with such methods are disadvantageously dependent upon the size of the bins or classes and upon the precise position of the more or less arbitrarily chosen boundaries between adjacent bins.

Other methods for comparing histograms take into account not only exact correspondences or overlaps but also the similarity of classes or bins which are adjacent or situated close together. An example of this is offered by the distance measure for histograms published by Rubner et al. in the International Journal of Computer Vision, 40(2), pp. 99-121 and termed Earth Mover's Distance. These and comparable methods are in fact suitable for a substantially more meaningful assessment of the similarity of frequency distributions or histograms but entail the disadvantage of exceptionally high computational complexity. Thus the computational complexity with the mentioned method for calculating the so-called Earth Mover's distance increases with an increasing number of measuring value classes by between $O(N^3)$ and $\exp(N)$ if N is the number of classes.

In particular for applications in which a large number of measuring value classes is used and are to be compared, such a high computational complexity even when comparing one pair of measuring value sets can be unacceptable.

SUMMARY OF INVENTION

The present invention relates to a method for automated comparison of two sets of measuring values, which method allows reliable measurement of a similarity between these sets such that even a fairly great similarity of more closely situated bins or classes relative to remote bins is taken into account, the method being intended to be implemented with comparatively low computational complexity and thus to be suitable also for evaluation of a large number of pairs of measuring value sets. Furthermore, the object underlying the invention is to develop a corresponding device for the automated comparison of two sets of measuring values.

In the case of the proposed method for automated comparison of two sets of measuring values, the measuring values of the two sets are therefore assigned respectively to one class from a finite number of classes defined by indices so that a frequency distribution is defined respectively for each of the two sets, which frequency distribution indicates for each class a frequency of the measuring values assigned to this class, after which a distance measure between these frequency distributions is calculated in the subsequently described manner as a function of a final value of a first auxiliary value termed here match merely by way of example. The distance measure is thereby determined with comparatively low computational complexity such that it indicates, in a meaningful manner, a similarity or dissimilarity between the two sets of measuring values.

For this purpose, the first auxiliary value match is calculated by an algorithm using two sets of variables in that, with a given maximum distance $d_{max} \geq 1$ for all integral distances d with $0 \leq d \leq d_{max}$, beginning with $d=0$ and continuing to larger distances d, respectively for all indices i and j at a distance from each other by the distance d a current value of a further auxiliary value is defined as $$m = \min(q_i', v_j')$$

wherein m stands for the further auxiliary value, $q_i'$ for the variables of a first of the two sets of variables and $v_j'$ for the variables of the second set of variables, the variables of the two sets of variables being defined at the beginning of the algorithm as $q_i' = q_i$, $v_j' = v_j$, wherein $q_i$ stands for the frequencies from a first of the two frequency distributions and $v_j$ for the frequencies of the second frequency distribution, after which respectively the variables $q_i'$ and $v_j'$ are defined again by subtracting the current value of the further auxiliary value m and the current value of the further auxiliary value m, multiplied by a matrix element $a_{i,j}$, is added to a current value of the first auxiliary value match defined originally as match=0, the matrix elements $a_{i,j}$ forming a similarity matrix with $a_{i,i}=1$ for all indices i and $0 \leq a_{i,j} < 1$ for all indices i and j at a distance of at most $d_{max}$ with $i \neq j$.

This method which can be implemented in a simple manner with a device designed correspondingly by programming technology is distinguished in that, on the one hand—with a weighting taking into account deviations by the matrix elements of the similarity matrix—also the frequencies of the measuring values which are assigned, from the two sets, to classes which are not identical but merely not too remote from each other—established by the maximum distance termed $d_{max}$—are compared with each other unless a correspondence of the frequencies is determined already in the case of identical or closely situated classes. This leads to a more reliable and meaningful measure, relative to conventional comparisons implemented merely bin for bin, for the similarity of the sets of measuring values, which appropriately takes into account in particular a random assignment of similar measuring values into adjacent classes. On the other hand, the method—differently from comparably meaningful known methods—can be achieved advantageously with exceptionally low computational complexity, which allows processing also of large quantities of measuring values and a comparison of a very large number of measuring value sets. With a given value of the maximum distance $d_{max}$, a computational complexity which is merely of the order O(N) as a function of the number of classes is in fact produced if N describes the number of classes. The method can lead possibly to very satisfactory results even for $d_{max}=1$.

The distance measure can be calculated in various ways as a function of the auxiliary value match or more precisely as a function of the final value of the first auxiliary value match, obtained according to the described algorithm, for example as $$\text{dist}=1-\text{match}/(\Sigma_i q_i)$$

wherein dist stands for the distance measure and $q_i$ is defined as above, the sum being formed over all the classes. The distance measure can be evaluated easily with this definition as dist ranges from dist=0 for identical and fairly large values of the distance measure up to dist=1 for less similar sets of pairs of measuring values.

It may be explained that all the names of the auxiliary values, free variable parameters and variables here and subsequently have been chosen of course merely by way of example and can be exchanged in any way.

In a typical embodiment of the invention which can be produced with an easily programmable algorithm, the indices are formed by n-tuples with an integral $n \geq 1$, the distance d between two arbitrary indices i and j being defined as $$d=\max_k(d_k)$$

wherein the maximum is formed over all k with $1 \leq k \leq n$ and $d_k$ is defined respectively as $$d_k=|i_k-j_k|$$

or as $$d_k=\min(|i_k-j_k|, I_k-|i_k-j_k|)$$

k indexing the places of the respective n-tuple and $i_k$ standing for the places of the index i, $j_k$ for the places of the index j and $I_k$ for the number of values which can be taken by the $k^{th}$ place of the indices denoting the classes. In the simplest case n=1 can thereby apply and d be defined as $d=|i-j|$ or $d=\min(|i-j|, I-|i-j|)$ with only one-place indices i, j, which can take I values. The classes can then correspond for example to various grey tone intervals between white and black if the measuring values reproduce brightnesses in different image points of two image recordings to be compared. In typical embodiments of the described method, n=2 or n=3 will however apply and n can of course also be even larger. The second alternative for the definition of $d_k$ is always available when, with the corresponding place of the indices, classes or bins of one measuring value with a cyclical property are indexed, for example a hue which can be displayed on a chromatic circle.

The matrix elements $a_{i,j}$ of the similarity matrix can be defined for example as $$a_{i,j}=1/[1+(\Sigma_k d_k^p)^{1/p}]$$

wherein $d_k$ is defined as above and p is a power which can be chosen for example as p=2, the sum over all k with $1 \leq k \leq n$ being formed. With a similarity matrix defined thus, adequate consideration of the similarity or dissimilarity of measuring value sets caused by assignment to more or less adjacent bins or classes can be achieved with low computational complexity.

Various algorithms can be used to calculate the first auxiliary value termed here match. A particularly easily programmable embodiment of the invention provides that for calculating the first auxiliary value match a first programme loop is opened in which the distance d runs in integral steps from 0 up to the chosen integral maximum distance $d_{max}$, after which, in succession for all integral k with $1 \leq k \leq n$ (e.g. beginning with k=1 and ending with k=n), respectively one programme loop is opened in which respectively an additional variable, termed here $h_k$ by way of example, runs over all integral values with $-d \leq h_k \leq +d$ (e.g. in integral steps from –d to +d), after which, in succession for all integral k with $1 \leq k \leq n$ (e.g. beginning with k=1 and ending with k=n), respectively a further programme loop is opened in which respectively the value of the place $i_k$ of the index i runs over all $I_k$ values which can be assumed by their place to index the classes (e.g. in integral steps from $i_k=1$ to $i_k=I_k$, if the classes are indexed correspondingly), the current value of the further auxiliary value m then being defined as $$m=\min(q_i', v_{i+h}')$$

wherein $q_i'$ is defined as above, h stands for the n-tuple formed from the variables $h_k$ and $v_{i+h}'$ stands for the variables of the second set of variables and is defined at the beginning of the algorithm as $v_{i+h}'=v_{i+h}$ if the n-tuple i+h has a value which can be taken by the indices of the classes, and as $v_{i+h}'=0$ or as $v_{i+h}'=v_{i+h+L}$ if at least one place of the n-tuple i+h has a value which cannot be taken by the corresponding place of the indices of the classes, L standing for an n-tuple which is defined by $L_k=0$ if the $k^{th}$ place of the n-tuple i+h has a value which can be taken by the corresponding place of the indices of the classes, and otherwise by $L_k=I_k$ or $L_k=-I_k$ so that all the places of the n-tuple i+h+L have a value which can be taken by the corresponding places of the indices of the classes, after which respectively the variables $q_i'$ and $v_{i+h}'$ are defined again by subtracting the current value of the further auxiliary value m and the current value of the further auxiliary value m, multiplied by the matrix element $a_{i,i+h}$, is added to a current value of the first auxiliary value match defined at the beginning of the algorithm as match=0, whereupon all the mentioned programme loops are closed again in the reverse sequence.

The thus described algorithm involves the computing step accompanying the new definition of the further auxiliary value m (described above according to the fourth sub-division line) and also the subsequent computing steps described above after the fifth sub-division step being implemented somewhat more often than would be necessary because, for each new value of d, the variables $h_k$ take all the values between −d and +d and the minimum min $(q_i', v_{i+h}')$ is also calculated consequently for those h for which the distance between i and i+h is smaller than d. However this is harmless because the new value of m, determined during this redundant number of computing steps, disappears respectively because at least one of the variables $q_1'$ and $v_{i+h}'$ has obtained the value 0 in these cases on the basis of a new definition in preceding passes of the programme loops.

In typical applications of the invention, the two sets of measuring values will have the property $\Sigma_i v_i = \Sigma_i q_i$, for example if each measuring value corresponds to one image point during a comparison of two images with a similar number of image points. In other cases, it can be expedient to standardise the measuring values first such that $\Sigma_i v_i = \Sigma_i q_i$ applies. The sums should thereby be understood again as formed over all the classes and $q_i$ and $v_i$ may be defined as above.

For automatic assessment of the similarity or dissimilarity between the compared sets of measuring values, the calculated distance measure can be compared with a threshold and/or with other correspondingly calculated distance measures between measuring value sets. The two sets of measuring values can then be assigned as similar to each other, for example dependent upon a result of this comparison.

A preferred application of the described method provides that it is used for determining a similarity between two images, the measuring values of the two sets reproducing image data of these two images. The measuring values can thereby be assigned in particular respectively to one image point. Typically, the classes then represent intervals for brightness values and/or hues and/or colour saturations, these intervals being chosen expediently for this such that they are situated closely together and cover all possible measuring values. Alternatively or additionally, the images can be divided spatially into sub-regions assigned to respectively one class or a sub-quantity of classes. These sub-regions can again be indexed for example with one or two index places.

If the measuring values correspond to image data, the method can serve for example for advantageously simple and reliable automatic scene recognition or for pattern recognition. Also images comprising a plurality of images can be compared thereby in the described manner in pairs or respectively with a reference image. Because of the low computational complexity, [CP1]also very large numbers of image pairs can thereby be compared if required.

BRIEF DESCRIPTION OF THE DREWINGS

Embodiments of the invention are described subsequently with reference to FIGS. 1 and 2. There are shown FIG. 1 a selection of histograms to be compared for illustration of an embodiment of the invention and FIG. 2 a graphic display of three measuring values which are suitable for comparison of images with a method in an embodiment by way of example.

DETAILED DESCRIPTION

Figure 1:
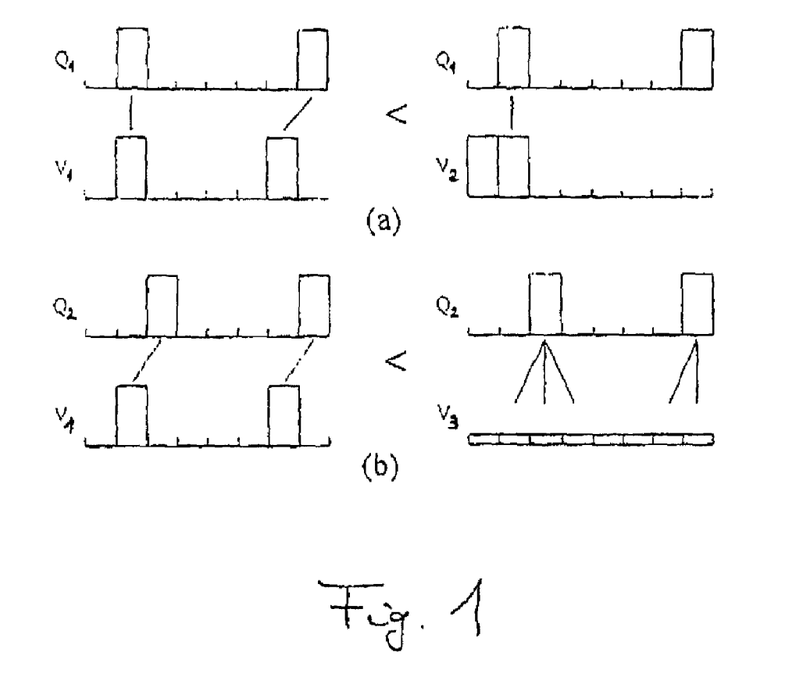

The first embodiment of the invention represents a method for comparing two images which are represented by respectively one set of measuring values, these measuring values for each image point of the corresponding image representing respectively one grey value between black and white and being able to have been detected for example with a video camera. Each of the measuring values of the two sets is assigned respectively to a class, also termed bin, from a finite number of I classes, each of these classes corresponding to a grey value interval and these intervals being situated closely together and covering all the grey steps from black to white. Thus, there is defined for each of the two sets respectively a frequency distribution which reproduces in this case a grey value distribution in that it indicates for each class a frequency of the measuring values of the corresponding set assigned to this class. Each of these frequency distributions can be displayed as a histogram. Examples of one-dimensional histograms of this type are illustrated in FIG. 1.

By means of a device which is designed correspondingly by programming technology, a distance measure, termed here dist, between the frequency distributions is calculated, which is defined such that it is suitable as a measure of similarity or dissimilarity between the two sets of measuring values and hence for a similarity or dissimilarity of the two images with respect to their grey value distributions. This distance measure need not thereby have all the properties of a metric in the mathematical sense.

The distance measure dist is thereby calculated with an algorithm which may be reproduced subsequently in a then more precisely explained manner:

match = 0

FOR $d = [0 \ldots d_{max}]$

FOR $h = [-d \ldots d_{max}]$

FOR $i = [1 \ldots I]$

$m = \min(q_i, v_{i+h})$             $q_i = q_i - m$             $v_{i+h} = v_{i+h} - m$             match = match + $m \times a_{i,i+h}$         END     END

END $$dist = 1 - \left(\text{match} \Big/ \sum_i / q_i\right)$$

Each line of this representation is intended to stand for a programme command, a first auxiliary value used to calculate the distance value dist being termed match and a further auxiliary value being termed m. d, h, i, $q_i$ and $v_j$ (j being chosen here respectively as i+h) concern further variables, $q_i$ and $v_j$ respectively belonging to a set of variables and being indexed with i or j=i+h. The lines beginning with FOR describe the beginning of a programme loop in which the thereafter mentioned variable runs in integral steps from the value on the left in the square bracket thereafter up to the value on the right in the same bracket. The lines containing the expression END describe respectively the end of the corresponding programme loop. All other lines which have the form of an equation should be understood as a definition of the variables to the left of the equals sign by the mathematical expression to the right of the equals sign which is comprehensible per se therefrom. A parameter is described with $d_{max}$ which describes a maximum distance between those classes, the frequencies of which, i.e. the assignments of which with measuring values of both sets, are intended to be taken into account because of the similarity of these classes even during assessment of the similarity of the measuring value sets. The maximum distance $d_{max}$ can be chosen in a simple embodiment of the invention for example as $d_{max}=1$, however even larger values are possible. The number I of the classes which also indicates up to what value the index i runs can be for example I=50 with respect to order of magnitude.

Furthermore, it is crucial that the variables $q_i$ and $v_j$ (for values of the indices i and j which correspond to classes) are correspondingly defined at the beginning of the method as the (assigned to the respective class) frequencies of the two frequency distributions such that therefore the variables $q_i$ before the first new definition of these variables correspond to the frequencies of the frequency distribution corresponding to a first image, the variables $v_j$ before a first new definition during running through the algorithm corresponding to the frequencies of the frequency distribution corresponding to the second image. In addition there applies $$v_j=0 \text{ if } j\leq 0 \text{ or } j>I,$$

$$a_{i,j}=1/[1+|i-j|],$$

the parameters $a_{i,j}$ requiring to be understood as matrix elements of a similarity matrix.

The thus obtained distance measure dist has the property, during a comparison of two identical images and hence a comparison of two identical frequency distributions, of assuming the value dist=0 and, during a comparison of increasingly more different images, of which only respectively the grey value distribution being taken into account here however, of assuming greater values up to dist=1. The method also thereby takes into account the similarity of measuring values, here therefore grey values, which in fact deviate only slightly from each other but are situated in adjacent classes or bins. The computational complexity for implementation of the method is nevertheless exceptionally low and increases with an increasing number I of classes merely with the order $O(I)_{[CP2]}$.

The dissimilarity, indicated by the distance measure dist, between different frequency distributions thereby corresponds to an impartially perceived deviation between the corresponding histograms. For example, this is illustrated in FIGS. 1(a) and (b).

In FIG. 1(a) on the left, a first frequency distribution $Q_1$ and a second frequency distribution $V_1$ are illustrated one above the other and to the right adjacently the same first frequency distribution $Q_1$ above another second frequency distribution $V_2$. Both the frequency distributions $Q_1$ and $V_1$ and the frequency distributions $Q_1$ and $V_2$ correspond in precisely one bin. All three frequency distributions $Q_1$, $V_1$ and $V_2$ respectively show precisely one further bin with a non-disappearing frequency, these bins not corresponding however between $Q_1$ and $V_1$ and also between $Q_1$ and $V_2$. The distance measure determined with the described method will however turn out to be smaller during a comparison of the frequency distributions $Q_1$ and $V_1$ illustrated on the left in FIG. 1(a) than during a comparison of the frequency distributions $Q_1$ and $V_2$ illustrated there on the right because the non-corresponding bins with the two first mentioned frequency distributions $Q_1$ and $V_1$ are situated closer together than in the case of the frequency distributions $Q_1$ and $V_2$. In this respect, the assessment of the similarity or dissimilarity between the two pairs of frequency distributions $Q_1$ and $V_1$ or $Q_1$ and $V_2$ corresponds with impartial perception. In the case of a simple comparison respectively of the two histograms bin for bin, in contrast, the similarity or dissimilarity between the frequency distributions $Q_1$ and $V_1$ or $Q_1$ and $V_2$ would be assessed to be the same contrary to impartial perception.

In a corresponding representation, a further example is illustrated in FIG. 1(b), as a result of which another first frequency distribution $Q_2$, as illustrated there on the left, is intended to be compared with the frequency distribution $V_1$ shown already in FIG. 1(a) and in addition when applying the same method with another second frequency distribution $V_3$ which is shown in FIG. 1(b) on the right under the frequency distribution $Q_2$. The frequency distribution $V_3$ thereby represents an equal distribution, whilst the frequency distribution $Q_2$ again shows only two bins with a non-disappearing frequency, which are slightly displaced however relative to the occupied bins of the frequency distribution $V_1$. With the method proposed here, the two frequency distributions $Q_2$ and $V_1$ represented on the left in FIG. 1(b) are assessed to be deviating less from each other than the two frequency distributions $Q_2$ and $V_3$ represented on the right in FIG. 1(b). This corresponds again to impartial perception. When applying a conventional simple method in which the frequency distributions or histograms are compared merely bin for bin, the distance between the two frequency distributions $Q_2$ and $V_3$ illustrated on the right would in contrast be assessed inappropriately to be smaller than the distance or the dissimilarity between the much more similar histograms or frequency distributions $Q_2$ and $V_1$. The result achieved with the method proposed here is also much less sensitive with respect to an assignment of measuring values to adjacent bins, which is dependent upon the precise position of the boundaries between the bins and therefore random to a certain extent.

Of course, also sets of any other type of measuring values which can be divided into one-dimensionally indexable classes, could be compared with each other in the described manner. The measuring values can thereby also reproduce measuring dimensions which have in this respect a cyclical structure when a great similarity not only between directly adjacent bins but also between a first and a last bin is to be taken into account. This can be the case for example if the measuring value reproduces a hue which can be displayed on a chromatic circle. In this case, it is expedient to replace the definition of the variables $v_j$ and $a_{i,j}$ in the above-described algorithm by the following definitions:

$$v_{j+I}=v_j,$$

$$a_{i,j}=1/[1+\min(|i-j|,I-(|i-j|)]$$

In a development of the invention with which processing also of measuring value sets with different numbers of measuring values per measuring value set is possible, the variables $v_i$ and $q_i$ are in addition firstly standardised such that there applies $\Sigma_i v_i = \Sigma_i q_i$.

The distance measure dist calculated in the described manner can finally be compared with a threshold and/or with other correspondingly calculated distances between other measuring value sets, whereupon the two sets of measuring values can be assigned, dependent upon a result of this comparison, as similar to each other or can be assessed as dissimilar.

The device used to implement this or other embodiments of the invention can concern a system which is suitable in addition for recording measuring values and for example can comprise a camera for recording image data or a mechanism for reading out such measuring values.

A second embodiment differs from the embodiment just described by its modifications in that the classes or bins into which the measuring values are divided are indexed by an index pair. This is expedient if the measuring values reproduce two measuring dimensions, i.e. are two-dimensional. (The term measuring value in the sense of the present document should comprise the case where the measuring value is multidimensional.) In the case of image data, these measuring dimensions can be for example a brightness and a colour saturation or a brightness and a hue or a hue and a colour saturation. Each place of the index pair then indexes a subinterval comprising a measuring value space of the corresponding measuring dimension. The algorithm used for the method in this embodiment of the invention differs slightly from the previously described algorithm and is reproduced subsequently in a corresponding, self-explanatory manner:

```
match = 0
FOR d = [0 ... d_max]
    FOR g = [-d ... d]
        FOR h = [-d ... d]
            FOR i = [1 ... I]
                FOR j = [1 ... J]
                    m = min(q_{i,j}, v_{i+g,j+h})
                    q_{i,j} = q_{i,j} - m
                    v_{i+g,j+h} = v_{i+g,j+h} - m
                    match =
                        match + m × a_{i,j;i+g,j+h}
                END
            END
        END
    END
END
```

$$dist = 1 - \left(\text{match} \bigg/ \sum_{i,j} q_{i,j}\right)$$

with $V_{k,l} = 0$ if $k \leq 0$ or $k > I$ or $l \leq 0$ or $l > J$, and $a_{i,j;k,l} = 1/\left[1 + (|i-k|^2 + |j-l|^2)^{1/2}\right]$.

It may be assumed for a modification of the method resulting therewith that the measuring values of both sets of measuring values to be compared should again be assigned respectively to one image point of two images to be compared and represent the hue and the colour saturation of the respective image point. A hue channel may thereby be divided into I bins or classes which are indexed by the first place of the index pair (i, j). Because the hue can be displayed expediently on a chromatic circle and is in this respect a cyclical measuring dimension, the first and the last class defined by the first place of the index pair are intended to be treated as adjacent. For this purpose, the definitions of the variables $v_{k,l}$ and of the matrix elements $a_{i,j;k,l}$ should be modified as follows:

$V_{k,l} = 0$ if $l \leq 0$ or $l > J$, $V_{k+I,l} = V_{k,l}$, $a_{i,j;k,l} = 1/[1+(\min(|i-k|,I-|i-k|))^2+|j-l|^2)^{1/2}]$ For the variables $q_{i,j}$ and $v_{i,j}$, the indices of which correspond to classes, it should of course apply respectively, as in the first embodiment, that these variables are defined correspondingly at the beginning of the algorithm as the frequencies of the two frequency distributions to be compared.

Analogously, also sets of measuring values can of course be compared, in the case of which each measuring value reproduces results for a fairly large number of in general n measuring dimensions. In that case, it is expedient to divide the measuring values into classes which are indexed with n-tuples. The algorithm then to be used would result by a modification of the previously described embodiment such that the core of the algorithm can be reproduced in the corresponding representational manner in the following way:

```
match = 0
FOR d = [0 ... d_max]
    FOR h_1 = [-d ... d]
        ⋮
        FOR h_n = [-d ... d]
            FOR i_1 = [1 ... I_1]
                ⋮
                FOR i_n = [1 ... I_n]
                    m = min(q_{i_1, ..., i_n}, V_{i_1+h_1, ..., i_n+h_n})
                    q_{i_1, ..., i_n} = q_{i_1, ..., i_n} - m
                    v_{i_1+h_1, ..., i_n+h_n} = v_{i_1+h_1, ..., i_n+h_n} - m
                    match = match + m × a_{i_1, ..., i_n; i_1+h_1, ..., i_n+h_n}
                END
                ⋮
            END
        END
        ⋮
    END
END
```

$$dist = 1 - \left(\text{match} \bigg/ \sum_{i_1, ..., i_n} q_{i_1, ..., i_n}\right)$$

The variables $q_{i_1, ..., i_n}$ and $v_{j_1, ..., j_n}$ now indexed with n-place indices are defined correspondingly again at the beginning of the algorithm as the frequencies of the two frequency distributions to be compared, a corresponding definition of the variables $v_{j_1, ..., j_n}$ for those index assignments which correspond to no class being able to take into account, analogously to the previous examples, whether a measuring dimension has a cyclical character or not.

The number of measuring dimensions n which reproduces a dimension of the then multidimensional measuring values can take any values with n>1.

Figure 2:
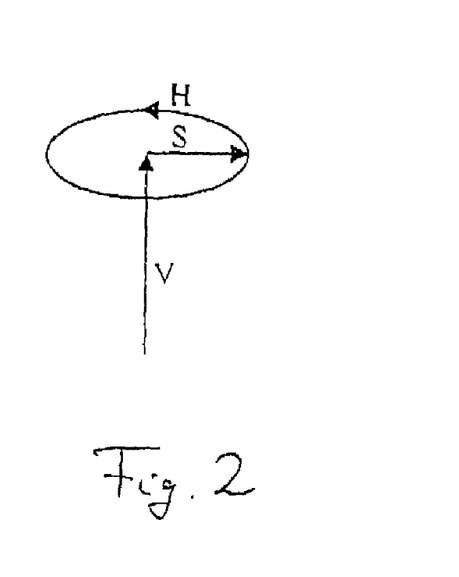

In a just described example, n=3 may be chosen, the measuring values for each image point of images to be compared, corresponding to the HSV display of the colour space, being intended to represent a brightness, a hue and a colour saturation. A graphic illustration of this display of the colour space is reproduced in FIG. 2, V (value) standing there for the brightness, S (saturation) for the colour saturation and H (hue) for the hue. Of the three measuring dimensions, for instance one, namely the hue H, should be treated as the cyclical measuring dimension.

The described method can serve in its various embodiments in particular for automatic scene recognition or pattern recognition. In the case of higher-dimensional measuring values, in addition to the mentioned colour features, also a spatial structure of the image can be taken into account. In the described manner, also images comprising a possibly very large number of images can thereby be compared in pairs or respectively with one or more reference images. The described method which serves in general for a comparison of frequency distributions in the case of measuring values is therefore suitable in particular for a comparison of frequency distributions which reproduce image properties or image features. A preferred application resides in the comparison of frequency distributions of colours in images to be compared.

Because of the low computational complexity of the proposed method, it can be used with particular advantage for automatic scene recognition, preferably in the form of the described comparison of colour histograms. The described method or the described algorithm performs in particular the following:

Similar colours can be treated as similar and be taken into account even if they are assigned to different classes or bins. This corresponds very extensively to a constant modelling of the colour similarity in contrast to simple discretisation of the colour space without taking into account the mentioned similarities. Thus also images which originate from shots with slightly varying illumination or shading can be compared and recognised as similar.

The proposed distance measure is suitable, according to what has been said, also for a comparison of multidimensional colour histograms which have a greater differentiation power than one-dimensional histograms because more information is taken into account.

All this is achieved with exceptionally low computational complexity. Thus it is for example conceivable to examine a film which can comprise for example between 1,000 and 2,000 shots with the described method. If a plurality of key frames (representative images of a shot) are used for each shot and if each shot is intended to be compared for example with its fifty predecessors, each key frame of one shot being intended to be compared with each key frame of the other shot for each pair of shots, for such applications an order of magnitude on average of 100,000 histogram comparisons or comparisons of sets of measuring values can be required. With the methods described here, this object can be satisfactorily dealt with because of the exceptionally low computational complexity.

For automatic implementation of the described method, a device is proposed which was described at another point as "correspondingly programmed" or as "designed by programming technology to implement the method". This device can be described more precisely as a device for automated comparison of two sets of measuring values which are represented respectively by one frequency distribution (which measuring values can be provided for example by image data of two images), the device being designed by programming technology for implementing subsequently mentioned steps if each of the two frequency distributions for each class from a finite number of classes defined by indices respectively indicates a frequency of the measuring values, assigned to this class, of the set represented by this frequency distribution:

calculation of a first auxiliary value termed here match by way of example match by an algorithm using two variable sets in that, with a given maximum distance $d_{max} \geq 1$ for all integral distances d with $0 \leq d \leq d_{max}$, beginning with d=0 and continuing to larger distances d, respectively for all indices i and j at a distance from each other by the distance d a current value of a further auxiliary value is defined as $$m=\min(q_i', v_j')$$

wherein m stands for the further auxiliary value, $q_i'$ for the variables of a first of the two sets of variables and $v_j'$ for the variables of the second set of variables, the variables of the two sets of variables being defined at the beginning of the algorithm as $q_i'=q_i$, $v_j'=v_j$, wherein $q_i$ stands for the frequencies from a first of the two frequency distributions and $v_j$ for the frequencies of the second frequency distribution, after which respectively the variables $q_i'$ and $v_i'$ are defined again by subtracting the current value of the further auxiliary value m and the current value of the further auxiliary value m, multiplied by a matrix element $a_{i,j}$, is added to a current value of the first auxiliary value match defined originally as match=0, the matrix elements $a_{i,j}$ forming a similarity matrix with $a_{i,i}=1$ for all indices i and $0 \leq a_{i,j} < 1$ for all indices i and j at a distance of at most $d_{max}$ with $i \neq j$.

calculation of a distance measure reflecting a similarity or dissimilarity between the two sets of measuring values between the mentioned frequency distributions as a function of a thus obtained final value of the first auxiliary value match.

The device is therefore programmed such that it implements, in response to a corresponding command—e.g. after input or reading in of two frequency distributions of the described type—a programme comprising the mentioned steps. In an advantageous embodiment, the device is designed furthermore by programming technology to assign, before implementation of these steps, the measuring values of both sets after input or after reading in of these measuring values respectively to a class from a finite number of classes defined by indices so that a frequency distribution is defined respectively for each of the two sets and indicates, for each class, a frequency of the measuring values assigned to this class, these frequency distributions then being used as the frequency distributions representing the sets of measuring values. In addition, the device can be designed by programming technology to implement the mentioned or further steps such as is produced from the various dependent method claims or from the description of the embodiments.

The invention claimed is:

1. A method for an automated comparison of two sets of measuring values, comprising:

assigning the measuring values of the two sets respectively to one class from a finite number of classes defined by indices so that a frequency distribution is defined respectively for each of the two sets, which frequency distribution indicates for each class a frequency of the measuring values assigned to this class;

calculating a distance measure reflecting a similarity or dissimilarity between the two sets of measuring values between these frequency distributions as a function of a final value of a first auxiliary value termed here match by way of example;

calculating the first auxiliary value match by an algorithm using two sets of variables in that, with a given maximum distance $d_{max} \geq 1$ for all integral distances d with $0 \leq d \leq d_{max}$, beginning with d=0 and continuing to larger distances d, respectively for all indices i and j at a distance from each other by the distance d;

a current value of a further auxiliary value is defined as $$m=\min(q_i', v_j')$$

wherein m stands for the further auxiliary value, $q_i'$ for the variables of a first of the two sets of variables and $v_j'$ for the variables of the second set of variables, the variables of the two sets of variables being defined at the beginning of the algorithm as $q_i'=q_i$, $v_j'=v_j$, wherein $q_i$ stands for the frequencies from a first of the two frequency distributions and $v_j$ for the frequencies of the second frequency distribution;

after which, defining again respectively the variables $q_i'$ and $v_j'$ by subtracting the current value of the further auxiliary value m and the current value of the further auxiliary value m, multiplied by a matrix element $a_{i,j}$, is added to a current value of the first auxiliary value match defined originally as match=0, the matrix elements $a_{i,j}$ forming a similarity matrix with $a_{i,i}=1$ for all indices i and $0 \leq a_{i,j} \leq 1$ for all indices i and j at a distance of at most $d_{max}$ with $i \neq j$.

2. The method according to claim 1, wherein the distance measure is calculated as a function of the final value of the first auxiliary value match as $$\text{dist}=1-\text{match}/(\Sigma_i q_i)$$

wherein dist stands for the distance measure and $q_i$ is defined as above, the sum being formed over all the classes.

3. The method according to claim 1, wherein the indices are formed by n-tuples with an integral $n \geq 1$, the distance d between two arbitrary indices i and j being defined as $$d=\max_k(d_k)$$

wherein the maximum is formed over all k with $1 \leq k \leq n$ and $d_k$ is defined respectively as one of (a) $d_k=|i_k-j_k|$ and (b) $d_k=\min(|i_k-j_k|, I_k-|i_k-j_k|)$, k indexing the places of the respective n-tuple and $i_k$ standing for the places of the index i, $j_k$ for the places of the index j and $I_k$ for the number of values which can be taken by the $k^{th}$ place of the indices describing the classes.

4. The method according to claim 3, wherein the matrix elements $a_{i,j}$ of the similarity matrix are defined as $$a_{i,j}=1/[1+(\Sigma_k d_k^2)^{1/2}]$$

wherein $d_k$ is defined as above and the sum over all k with $1 \leq k \leq n$ is formed.

5. The method according to claim 3, wherein, for calculating the first auxiliary value match, a first programme loop is opened in which the distance d runs in integral steps from 0 up to the integrally chosen maximum distance $d_{max}$, after which, in succession for all k with $1 \leq k \leq n$, respectively one programme loop is opened in which respectively an additional variable, termed here $h_k$ by way of example, runs over all integral values with $-d \leq h_k \leq +d$, after which, in succession for all k with $1 \leq k \leq n$, respectively a further programme loop is opened in which respectively the value of the place $i_k$ of the index i runs over all $I_k$ from this place in order to index the classes of assumable values, the current value of the further auxiliary value m then being defined as $$m=\min(q_i', v_{i+h}')$$

wherein $q_i'$ is defined as above, h stands for the n-tuple formed from the variables $h_k$ and $v_{i+h}'$ stands for the variables of the second set of variables and is defined at the beginning of the algorithm as $v_{i+h}'=v_{i+h}$ if the n-tuple i+h has a value which can be taken by the indices of the classes, and as $v_{i+h}'=0$ or as $v_{i+h}'=v_{i+h+L}$ if at least one place of the n-tuple i+h has a value which cannot be taken by the corresponding place of the indices of the classes, L standing for an n-tuple which is defined by $L_k=0$ if the $k^{th}$ place of the n-tuple i+h has a value which can be taken by the corresponding place of the indices of the classes, and otherwise by $L_k=I_k$ or $L_k=-I_k$ so that all the places of the n-tuple i+h+L have a value which can be taken by the corresponding places of the indices of the classes, after which respectively the variables $q_i'$ and $v_{i+h}'$ are defined again by subtracting the current value of the further auxiliary value m and the current value of the further auxiliary value m, multiplied by the matrix element $a_{i,i+h}$, is added to a current value of the first auxiliary value match defined at the beginning of the algorithm as match=0, whereupon all the mentioned programme loops are closed again in the reverse sequence.

6. The method according to claim 1, wherein the measuring values are first normalized such that $\Sigma_i v_i = \Sigma_i q_i$ applies, and wherein $q_i$ and $v_i$ are defined as above and the sums are formed over all the classes.

7. The method according to claim 1, wherein the calculated distance measure is compared with at least one of (a) a threshold and (b) other correspondingly calculated distance measures between measuring value sets and the two sets of measuring values are then assigned as similar to each other, dependent upon a result of this comparison.

8. The method according to claim 1, wherein the method is used for determining a similarity between two images, the measuring values of the two sets reproducing image data of corresponding two images.

9. The method according to claim 8, wherein the measuring values are assigned respectively to one image point, the classes representing intervals for at least one of (a) brightness values, (b) hues and (c) color saturations.

10. The method according to claim 8, wherein the method utilized for one of (a) automatic recognition of one of scene-shot changes, shot-shot changes and sub-shot changes and (b) pattern recognition.

11. The method according to claim 8, wherein images comprising a plurality of images are compared in pairs or respectively with a reference image.

12. A non-transitory computer readable medium including a set of instructions executable by a processor for an automated comparison of at least two sets of measuring values, the set of instructions operable to:

assigning the measuring values of the two sets respectively to one class from a finite number of classes defined by indices so that a frequency distribution is defined respectively for each of the two sets, which frequency distribution indicates for each class a frequency of the measuring values assigned to this class;

calculating a distance measure reflecting a similarity or dissimilarity between the two sets of measuring values between these frequency distributions as a function of a final value of a first auxiliary value termed here match by way of example;

calculating the first auxiliary value match by an algorithm using two sets of variables in that, with a given maximum distance $d_{max} \geq 1$ for all integral distances d with $0 \leq d \leq d_{max}$, beginning with d=0 and continuing to larger distances d, respectively for all indices i and j at a distance from each other by the distance d;

a current value of a further auxiliary value is defined as $$m=\min(q_i', v_j')$$

wherein m stands for the further auxiliary value, $q_i'$ for the variables of a first of the two sets of variables and $v_j'$ for the variables of the second set of variables, the variables of the two sets of variables being defined at the beginning of the algorithm as $q_i'=q_i$, $v_j'=v_j$, wherein $q_i$ stands for the frequencies from a first of the two frequency distributions and $v_j$ for the frequencies of the second frequency distribution;

after which, defining again respectively the variables $q_i'$ and $v_j'$ by subtracting the current value of the further auxiliary value m and the current value of the further auxiliary value m, multiplied by a matrix element $a_{i,j}$, is added to a current value of the first auxiliary value match defined originally as match=0, the matrix elements $a_{i,j}$ forming a similarity matrix with $a_{i,i}=1$ for all indices i and $0 \leq a_{i,j} \leq 1$ for all indices i and j at a distance of at most $d_{max}$ with $i \neq j$.

13. A device for an automated comparison of at least two sets of measuring values, comprising:

a memory storage storing the measuring values; and
a processor performing the following steps:
  assigning the measuring values of the two sets respectively to one class from a finite number of classes defined by indices so that a frequency distribution is defined respectively for each of the two sets, which frequency distribution indicates for each class a frequency of the measuring values assigned to this class;
  calculating a distance measure reflecting a similarity or dissimilarity between the two sets of measuring values between these frequency distributions as a function of a final value of a first auxiliary value termed here match by way of example;
  calculating the first auxiliary value match by an algorithm using two sets of variables in that, with a given maximum distance $d_{max} \geq 1$ for all integral distances d with $0 \leq d \leq d_{max}$, beginning with d=0 and continuing to larger distances d, respectively for all indices i and j at a distance from each other by the distance d;
  a current value of a further auxiliary value is defined as $$m = \min(q_i', v_j')$$

wherein m stands for the further auxiliary value, $q_i'$ for the variables of a first of the two sets of variables and $v_j'$ for the variables of the second set of variables, the variables of the two sets of variables being defined at the beginning of the algorithm as $q_i'=q_i$, $v_j'=v_j$, wherein $q_i$ stands for the frequencies from a first of the two frequency distributions and $v_j$ for the frequencies of the second frequency distribution;

after which, defining again respectively the variables $q_i'$ and $v_j'$ by subtracting the current value of the further auxiliary value m and the current value of the further auxiliary value m, multiplied by a matrix element $a_{i,j}$, is added to a current value of the first auxiliary value match defined originally as match=0, the matrix elements $a_{i,j}$ forming a similarity matrix with $a_{i,i}=1$ for all indices i and $0 \leq a_{i,j} \leq 1$ for all indices i and j at a distance of at most $d_{max}$ with $i \neq j$.

* * * * *